United States Patent [19]

Humble et al.

[11] Patent Number: 4,516,873

[45] Date of Patent: May 14, 1985

[54] SAILBOARD BOOM-TO-MAST CONNECTOR

[76] Inventors: David R. Humble, 2696 Emerald Way, Deerfield Beach, Fla. 33441; Hans Barth, 1720 NE. 17th Ave., Ft. Lauderdale, Fla. 33305

[21] Appl. No.: 482,470

[22] Filed: Apr. 6, 1983

[51] Int. Cl.³ .............................................. B63B 15/00
[52] U.S. Cl. .................................... 403/191; 403/234; 114/39
[58] Field of Search ............................ 114/39, 97, 98; 403/191, 234

[56] References Cited

U.S. PATENT DOCUMENTS 4,424,759 1/1984 Dolence ................................. 114/97
4,448,142 5/1984 Pollard ................................ 114/99 X

FOREIGN PATENT DOCUMENTS 3100624 8/1982 Fed. Rep. of Germany ........ 114/97
616374 3/1980 Switzerland ........................... 114/98
2019333 10/1979 United Kingdom .
2036675 7/1980 United Kingdom .
2105280 3/1983 United Kingdom .

Primary Examiner—Andrew V. Kundrat
Attorney, Agent, or Firm—Robin, Blecker & Daley

[57] ABSTRACT

For joining a wishbone boom to the mast of a sailboard there is provided a connector having a body to which is pivotally joined a pair of sockets for receiving the mast ends of the wishbone, the sockets straddling a pair of complemental semi-cylindrical jaws pivotally mounted on said body and arranged to embrace a mast. When the sockets are positioned generally normal to the longitudinal elements of the jaws the latter are urged together by the sockets to clamp on the mast. Moving the sockets as a unit through an arc relative to the body and jaws releases the jaws so that they can separate and release the mast.

4 Claims, 11 Drawing Figures

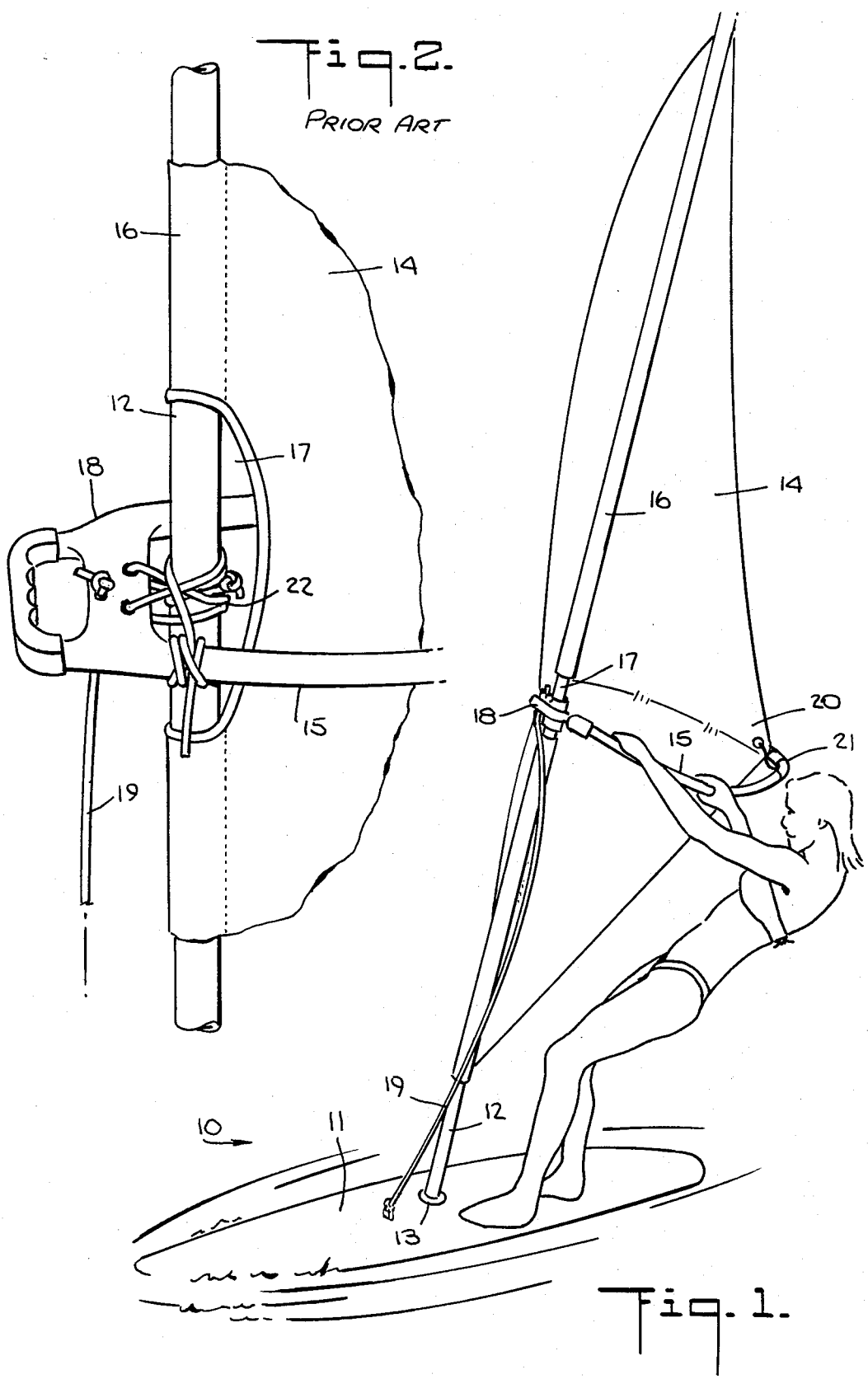

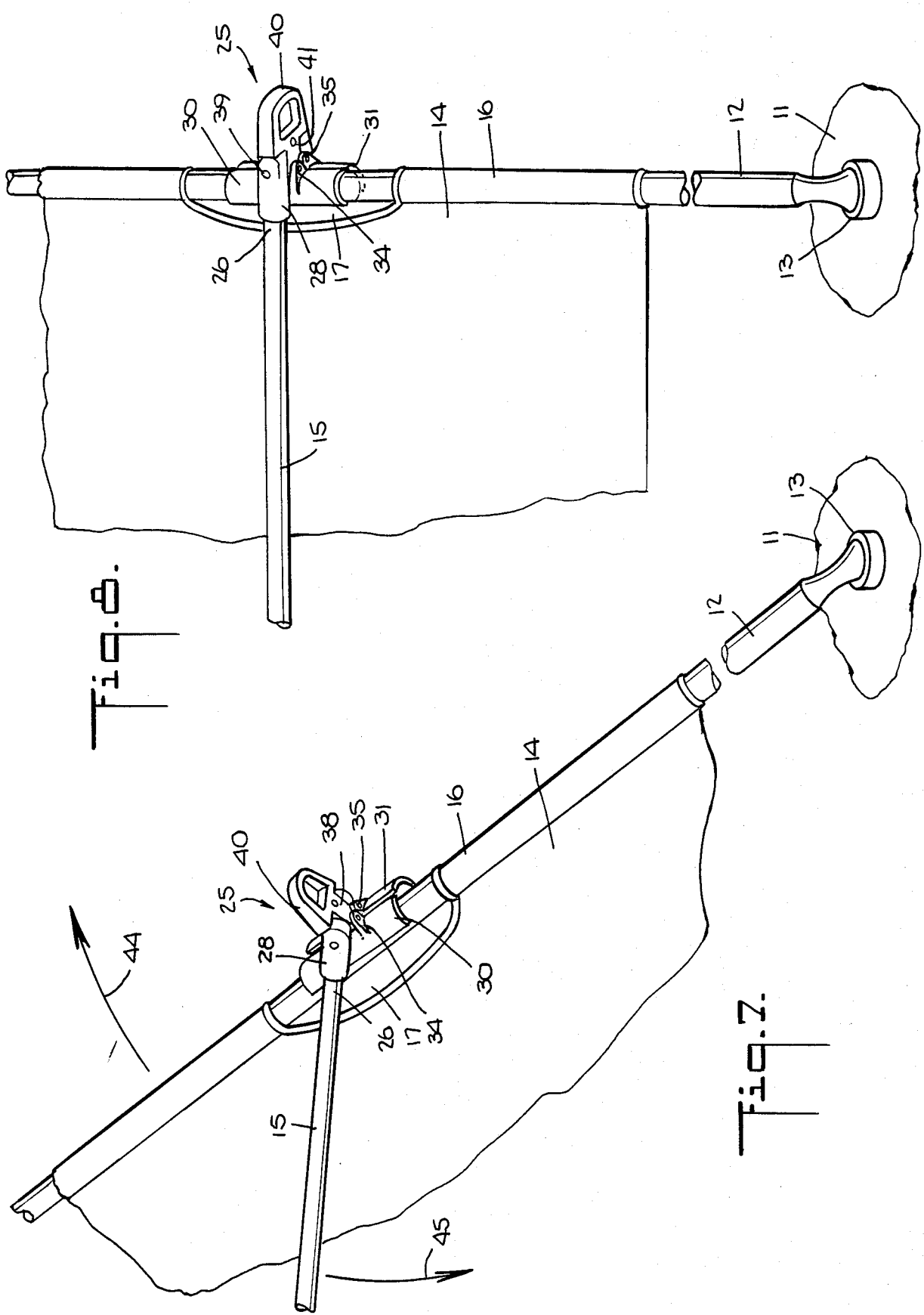

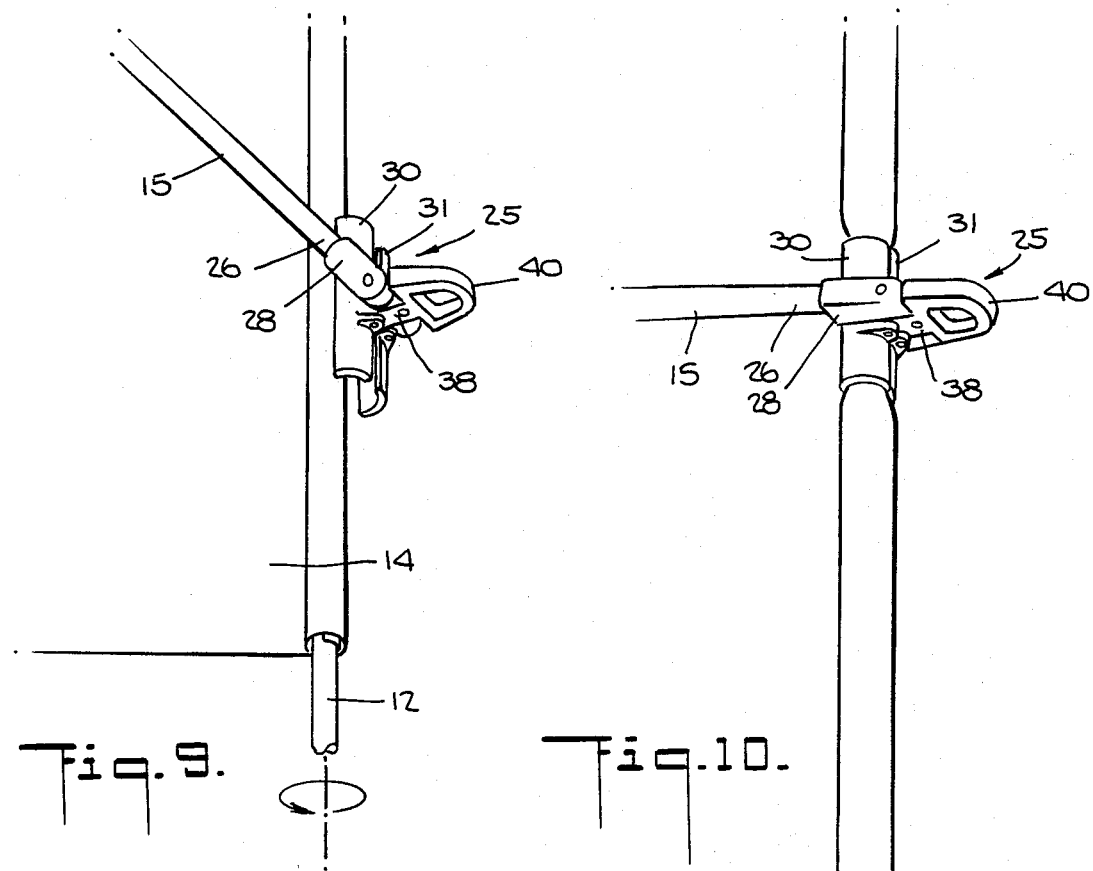
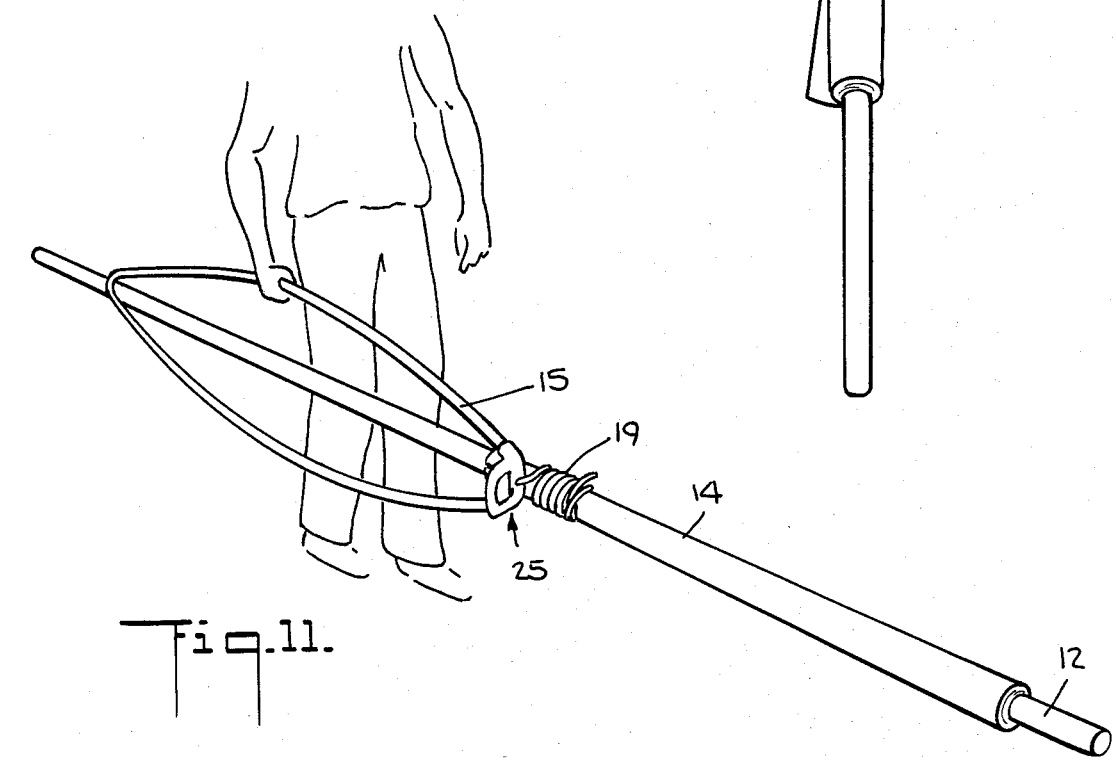

SAILBOARD BOOM-TO-MAST CONNECTOR

BACKGROUND OF THE INVENTION

The present invention relates to sailboards and to the sport of boardsailing. More particularly, it relates to the connection between the boom and mast of a sailboard.

A sailboard consists essentially of: (a) the board or hull; (b) the mast or spar; (c) the sail; and (d) the boom. In its most prevalent form, the boom consists of a generally elliptical assembly of two complementally curved booms, joined at the ends, and commonly called a "wishbone". The mast is connected to the board by a universal connection. The wishbone boom is secured at one of its ends to the mast by some form of connection. Heretofore, the principal method involved lashing, although various mechanical connections have been suggested. It has been recognized that for optimum control of the sailboard the boom-to-mast connection should be solid minimizing the amount of wobble permitted between boom and mast. While lashing is widely used, it is primitive, difficult to master by the beginner, and even when executed correctly yields inconsistent results due to stretching of the rope. Due to the difficulty in effecting an ideal boom-to-mast connection, and the time required to perform the procedure, most boardsailors have the boom and mast connected when transporting the sailboard although it would be desirable to remove the boom and furl the sail around the mast.

Due to the nature of the rope connection of the boom to the mast there is considerable flexibility for rotational motion or wobble about the longitudinal axis of the boom. This flexibility or play is not desirable for very much the same reason that play is to be avoided in any vehicle steering mechanism. The boom is what the boardsailor holds while sailing. It not only provides stability for the sailor but it constitutes the maneuvering device that must be pushed, pulled and turned to change the position of the sail and mast and control the direction of travel. When a maneuver is initiated by manipulating the boom, any slack in the rope connection must be absorbed before the mast and sail can respond. The sail, of course, is attached to the boom at the clew. The more rigid the connection of the boom and mast, the quicker the mast and sail will respond during the various maneuvers of tacking, jibbing, and sailing the various points of sail.

Another problem with the conventional rope connection is it precludes reefing the sail to reduce its area since the sail cannot be furled by wrapping around the mast while the boom is lashed to the mast. Reefing is sometimes necessary, or at least desirable, when a boardsailor is on the water and the wind increases to the point where it overpowers the full sail and makes the craft uncontrollable. If the sailor is offshore and there is an offshore wind that overpowers the craft, the sailor is in danger of being forced away from shore unless the sail area can be reduced and control of the craft can be reestablished. It would be advantageous and an improvement in boardsailing safety if one had the option of reducing the sail area with a convenient method of reefing the sail while on the water.

Mechanical connections for joining the boom to the mast have been proposed, but they have primarily concerned themselves with the problem of improving the speed and reducing the complexity of establishing the required connection. In one arrangement the wishbone is provided with a bracket having a projecting post terminating in a flat head. The headed post is used to enter a keyhole in a latch plate in the mast thereby joining the bracket to the mast. However, this arrangement affords very little restraint against wobbling about the long axis of the wishbone.

SUMMARY OF THE INVENTION

In accordance with the present invention there is provided a connector for establishing a boom-to-mast connection between the boom and the mast of a sailboard comprising in combination means for selectively clasping said mast, means operatively coupled to said clasping means for at least selectively urging the latter into clasping embrace of said mast, and means for joining said boom to said clasping means. In a presently preferred embodiment, the clasping means takes the form of a pair of complemental jaws, and the means for urging the jaws into clasping embrace include pivotally mounted sockets for receiving the ends of a wishbone assembly.

The novel connector provides a positive boom-to-mast connection free from slack or play and providing for increased safety and maneuverability of the sailboard. The connector is quickly and easily installed in a consistently secure fashion, and is just as quickly detached when desired. Various advantages are derived from the present invention as will appear from the description that follows.

BRIEF DESCRIPTION OF THE DRAWINGS

The invention will be better understood after reading the following detailed description of the presently preferred embodiment thereof with reference to the accompanying drawings in which:

FIG. 1 is a perspective view of a sailboard under sail showing the principal components thereof;

FIG. 2 is an enlarged fragmentary detail illustrating the prior art lashing connection of a wishbone to the mast;

FIG. 7 illustrates an intermediate step in the assembly operation;

FIG. 8 illustrates the final step in the assembly operation;

FIG. 9 illustrates disconnection of the connector to permit furling of the sail either for reefing or stowage;

FIG. 10 iillustrates the assembly of the connector to the completely furled sail; and FIG. 11 shows the use of the uphaul line for securing the jaws around the furled sail and mast for stowage and transporting.

The same reference numerals are used throughout the drawings to designate the same or similar parts.

DETAILED DESCRIPTION OF THE PREFERRED EMBODIMENT

Figure 3:
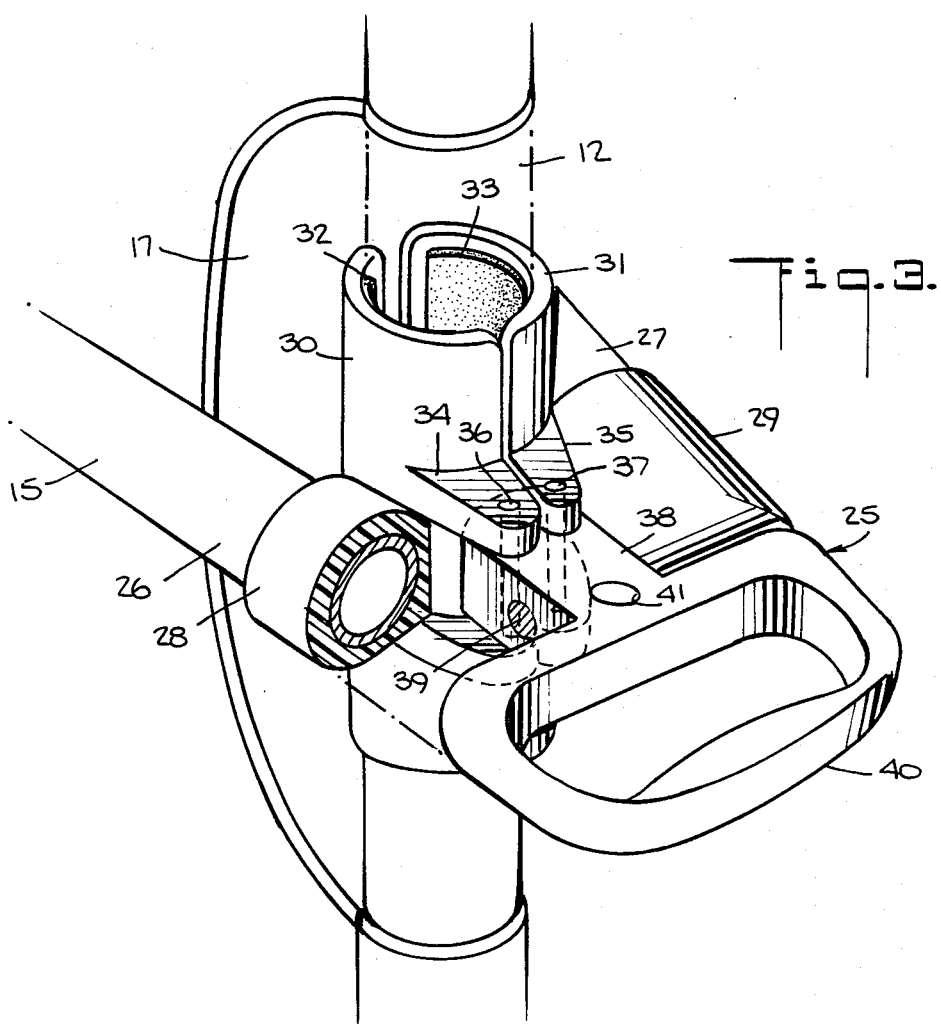
FIG. 3 is a fragmentary perspective view, with a portion broken away for clarity, of the connector constructed in accordance with the present invention.

Referring now to FIG. 1, there is shown a sailboard under sail designated generally by the reference numeral 10. The principal components are a board or hull 11, a mast or spar 12 joined to the board 11 by a socket type universal joint at 13, a sail 14, and a boom or wishbone 15. There are various sail configurations in use, all of generally triangular outline, having a hem formed sheath 16 at the luff that slips over the mast and is provided with a short interruption at 17 exposing the mast to permit joining the wishbone or boom to the mast with a suitable connector 18. Usually an uphaul line 19 is run between the connector 18 and the hull 11, as shown, to facilitate uprighting the craft if it should keel over. The sail is stretched between the mast and the end of the boom 15 by fastening the clew 20 to the boom end at 21. The general elements of a sailboard as described so far are well-known and it is not believed that further explanation is necessary.

The prior art method of securing the wishbone 15 to the mast 12 by lashing is illustrated in FIG. 2. The fore and aft clearance between the connector 18 and the mast 12 has been exaggerated for convenience in illustration. Nevertheless, it should be understood that sufficient play remains, no matter how carefully the lashing 22 is applied, that the wishbone 15 is permitted to wobble about the longitudinal axis that bisects both the connector 18 and the boom end 21, thereby reducing the control of the sailboard.

Now directing attention to FIG. 3, the connector 25 constructed in accordance with the present invention, is shown secured to the mast 12 with the ends 26 and 27 of the wishbone boom 15 secured in respective connector sockets 28 and 29. The mast 12 in the exposed area 17 is clasped securely between complemental semi-cylindrical jaws 30 and 31 of the connector which jaws are faced with respective elastomeric pads 32 and 33. Each of the jaws 30 and 31 is provided with a corresponding clevis 34 and 35 secured by pivot pins 36 and 37 which pass through the body member 38 parallel to the longitudinal elements of the jaws. A pin 39, traversing the body member 38, functions as a common pivot for the sockets 28 and 29 that are joined to opposite ends thereof such that the sockets move as a unit. As shown, the body member 38 is provided with a conventional handle or grip 40 and an aperture 41 for securing the uphaul line thereto. The connector 25 may be fabricated from any suitable corrosion resistant plastic or metal having the necessary strength and rigidity. Of course, the pads 32 and 33 are of elastic material of desired thickness and characteristic.

Figure 4:
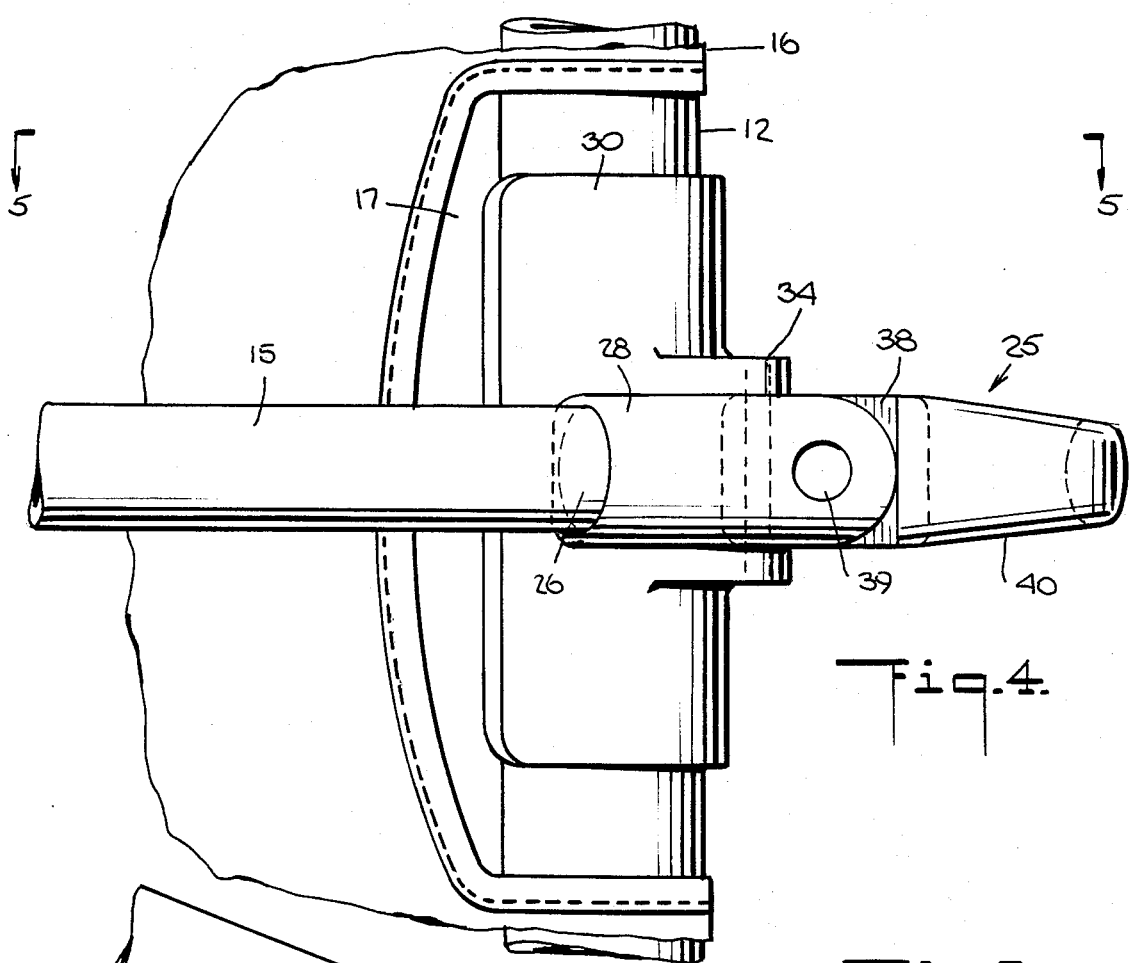
FIG. 4 is a side elevational view of the connector of FIG. 3.
Figure 5:
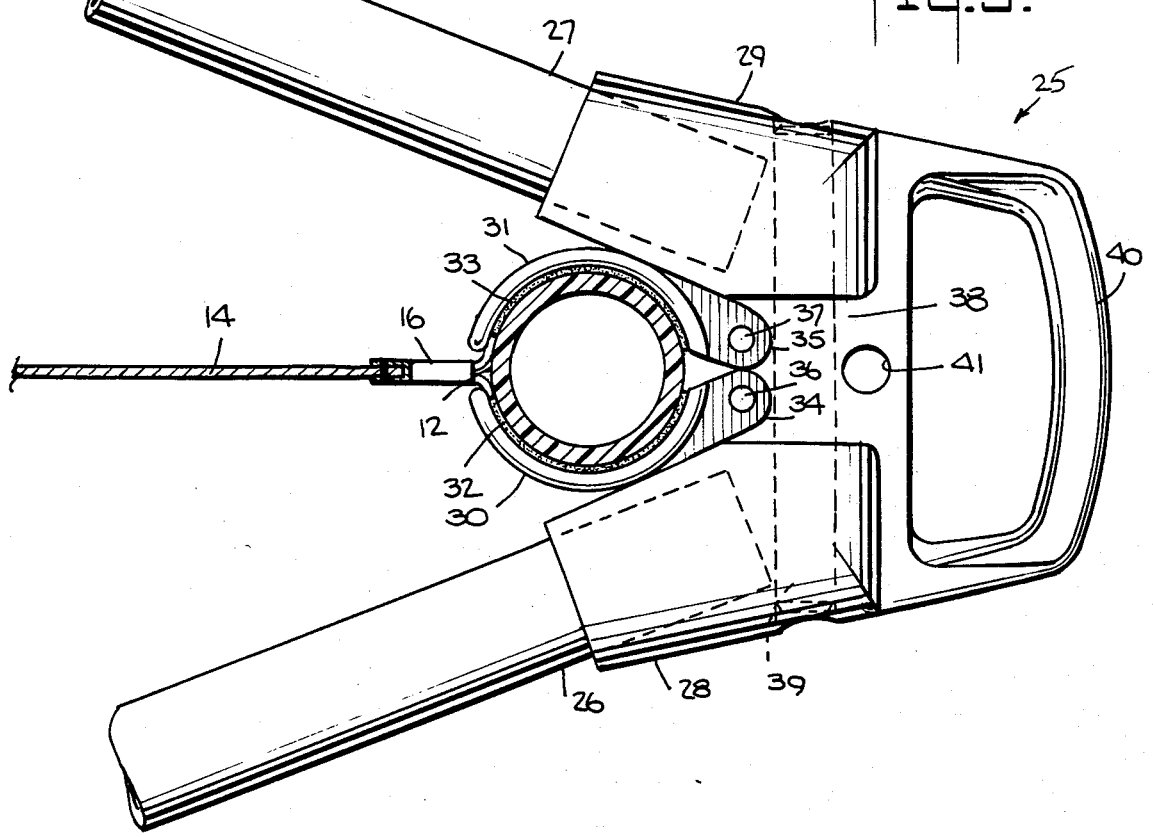
FIG. 5 is a sectional view taken along line 5—5 in FIG. 4.

When installed, the boom 15 will be generally horizontal while the mast 12 is oriented vertically. The sockets 28 and 29 of the connector 25 will straddle the jaws 30 and 31 urging them into clasping embrace of the mast 12 as best seen in FIG. 5. Attachment of the sail clew to the free end of the boom, see FIG. 1, will restrain the boom from pivoting downward about pin 39 while the weight of the boom and the grasp of the boardsailor will resist upward movement of the boom about pivot 39. The geometry is such, however, that approximately ±30° rotation about pivot 39 from the perpendicular position shown in FIG. 4 can be tolerated before the jaws 30 and 31 will be free to loosen their grip on the mast. Swinging the sockets 28 and 29 about pivot 39 until they assume the orientation shown in FIG. 6 will completely free jaws 30 and 31 so that they can open to permit passage of the mast 12 therebetween. The extent of jaw opening permitted should exceed the diameter of the mast to allow for the thickness of the sail when it is furled around the mast.

Figure 6:
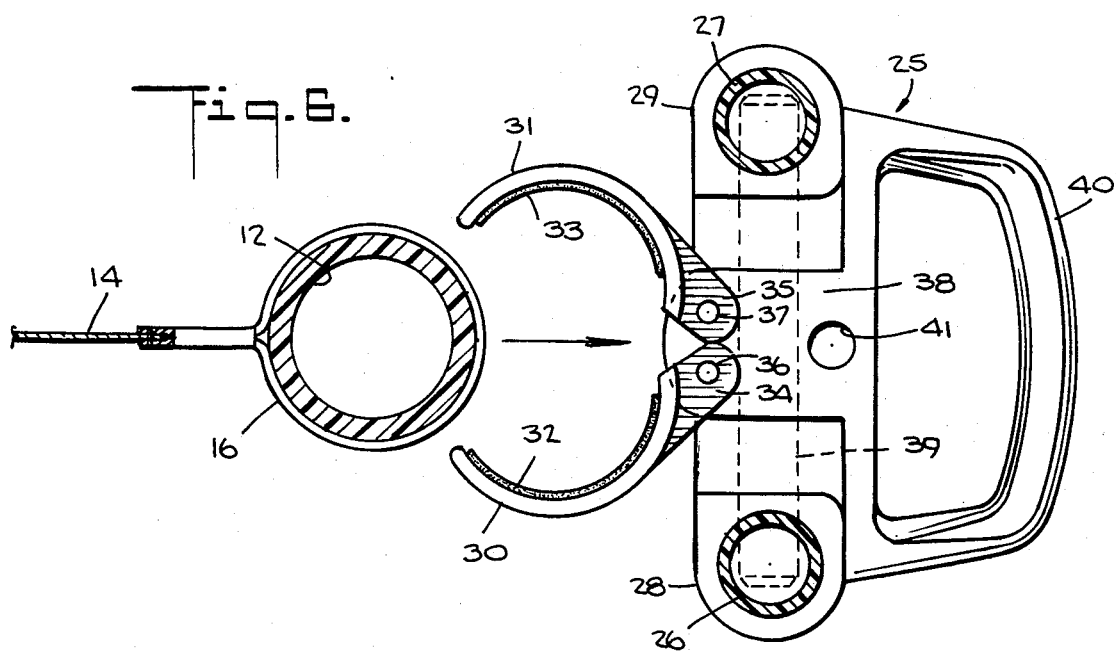
FIG. 6 is a view similar to FIG. 5 but showing the connector in open condition at the commencement of an assembly operation ready to receive a mast between its jaws.

Bearing in mind that the mast 12 is joined to the board 11 by a universal joint 13, the open jaws 30 and 31 of the connector 25 can be applied to the exposed section of the mast 12 as shown in FIG. 6 with the boom 15 oriented parallel to the mast. Then, as illustrated in the successive drawings of FIGS. 7 and 8 the mast can be raised while the boom 15 is lowered, all the while holding the connector 25 against the mast in order to clasp securely the mast between the jaws 30 and 31 of the connector 25. Since the jaws freely pivot relative to the body member 38, they can be manually grasped and held in engagement with the mast while the mast is raised and the boom is lowered in the relative directions shown by the arrows 44 and 45 in FIG. 7. When the boom and mast are at right angles as shown in FIG. 8, or within approximately ±30° of that orientation, the connector 25 is securely fastened to the mast. Any variation in diameter of the mast is accommodated by the elasticity of the elastomeric pads 32 and 33. Since the mast 12 is free to rotate in the fitting 13 relative to the board 11, the connection between the connector 25 and the mast 12 can be firm and positive.

There are occasions when under sail it is desirable to reef the sail in order to reduce its area. This can readily be accomplished with the novel connector by elevating the boom 15 as shown in FIG. 9 to release the grasp on the mast whereupon the sheath 16 of the sail can be wound or furled around the mast to the extent desired, after which the connector is reattached by applying it around the furled sail and lowering the boom 15. Again, any variation in diameter of the mast with furled sail will be accommodated by the cushioning effect of the elastomeric pads 32 and 33.

When it is desired to transport the sailboard it is merely necessary to furl completely the sail as shown in FIG. 10, apply the connector thereto, then use the uphaul line 19 or other available rope to lash the jaws 30 and 31 together about the furled sail as shown in FIG. 11, whereupon the boom can be positioned parallel to the mast for carrying the entire mast/boom assembly.

It should now be readily apparent that the connector constructed in accordance with the present invention permits rapid and easy joinder of a boom to the mast along with convenient reefing and transporting, all advantages not found in the heretofore known constructions. It will be understood by those skilled in the subject art that various changes in construction can be effected without departing from the true spirit of the invention as defined in the appended claims. All such variations are contemplated herein.

What is claimed is:

1. A connector for establishing a boom-to-mast connection between the boom and the mast of a sailboard comprising in combination a pair of complemental semi cylindrical jaws each joined to a body member for separate movement selectively between mast clasping and releasing positions, and at least one socket for receiving an end of said boom therein, said socket being pivotally and operatively joined to said body member for independent rotation about its pivot relative to said jaws in one direction or the other, rotation of said at least one socket about its pivot in said one direction being operative to urge at least one of said jaws into clasping embrace of said mast while rotation in said other direct enables said jaws to release said mast.

2. A connector according to claim 1, characterized in that a second socket is joined to said one socket by a common pivot, said sockets being constructed for receiving respectively the two mast ends of a wishbone boom and being moveable with said boom relative to said jaws about said pivot.

3. A connector according to claim 2, characterized in that there is provided a body member, said jaws being joined at one side to a jaw pivot that passes through said body member parallel to the elements of said semi-cylindrical jaws, and said common pivot passes through said body member adjacent said jaw pivot and in a plane normal to said jaw pivot, said sockets being disposed at opposite ends of said common pivot for movement as a unit through an arc between positions in which said sockets straddle said jaws forcing said jaws to assume said mast clasping condition, and in which said sockets free said jaws for opening.

4. A connector according to claim 3, characterized in that said jaws are fabricated of substantially rigid material and faced with a cushioning layer of elastomeric material.

* * * * *